US008104072B2

(12) United States Patent
Rohilla et al.

(10) Patent No.: US 8,104,072 B2
(45) Date of Patent: Jan. 24, 2012

(54) APPARATUS AND METHODS FOR AUTHENTICATING VOICE AND DATA DEVICES ON THE SAME PORT

(75) Inventors: Mandeep Rohilla, London (GB); Amro A. Younes, Redwood City, CA (US)

(73) Assignee: Cisco Technology, Inc., San Jose, CA (US)

( * ) Notice: Subject to any disclaimer, the term of this patent is extended or adjusted under 35 U.S.C. 154(b) by 712 days.

(21) Appl. No.: 11/553,430

(22) Filed: Oct. 26, 2006

(65) Prior Publication Data

US 2008/0101240 A1 May 1, 2008

(51) Int. Cl.
*G06F 21/20* (2006.01)

(52) U.S. Cl. .......................................... 726/4; 713/155

(58) Field of Classification Search .................. None
See application file for complete search history.

(56) References Cited

U.S. PATENT DOCUMENTS

| 7,421,503 | B1* | 9/2008 | Stieglitz et al. | 709/229 |
|---|---|---|---|---|
| 7,735,114 | B2* | 6/2010 | Kwan et al. | 726/1 |
| 2003/0031184 | A1 | 2/2003 | Cunetto | |
| 2005/0044271 | A1* | 2/2005 | Bastide et al. | 709/245 |
| 2005/0055570 | A1 | 3/2005 | Kwan et al. | |
| 2005/0246768 | A1* | 11/2005 | Hunt et al. | 726/11 |
| 2006/0168648 | A1* | 7/2006 | Vank et al. | 726/4 |
| 2006/0248229 | A1* | 11/2006 | Saunderson et al. | 709/245 |
| 2006/0259768 | A1* | 11/2006 | Chow | 713/168 |
| 2007/0230457 | A1* | 10/2007 | Kodera et al. | 370/389 |

FOREIGN PATENT DOCUMENTS

| EP | 1 628 458 | 2/2006 |
|---|---|---|
| WO | 2006/001647 | 1/2006 |

OTHER PUBLICATIONS

Guruprasad, A. et al., Security Features in Ethernet Switches for Access Networks. TENCON 2003—Conference on Convergent Technologies for Asia-Pacific Region; vol. 3, pp. 1211-1214 (Mar. 15, 2004).*
DRAFT Standard for Local and Metropolitan Area Networks—Port Based Access Control (Revision), IEEE P802.1X-REV/D11, Jul. 22, 2004.
SonicWALL Tech Notes CDP Frequently Asked Questions, http://www.sonicwall.com/downloads/SonicWALL_CDP_FAQ, Jul. 1, 2006.
International Search Report and Written Opinion dated Nov. 24, 2008 issued in PCT/07/82491.
Castelli, "Chapter: LAN Switching first-step—Chapter 8. Virtual LANs (VLANs)—VLAN Operation", Cisco Press, Jul. 8, 2004, (16 pp); http://etutorials.org/Networking/lan+switching/Chapter+8.+Virtual+LANs+VLANs/VLAN+Operation/.
Chinese Office Action for Application No. 200780035086.X mailed Jul. 12, 2011.

* cited by examiner

*Primary Examiner* — Huy Vu
*Assistant Examiner* — Benjamin Lamont
(74) *Attorney, Agent, or Firm* — Weaver Austin Villeneuve & Sampson LLP (57) ABSTRACT

Embodiments of the present invention allow authorization for a particular device or user to have access into a particular network so as to be bound to a specific domain or VLAN (virtual local area network). When authorization is tied to a domain, several devices can be authenticated into a single physical port of a network access device (e.g., access switch) and still only be given access to the one or more domam(s) or VLAN(s) that they are authorized to access based on their individual independent authorization outcomes.

20 Claims, 8 Drawing Sheets

- Phone sends out untagged packet, e.g., DHCP request, which is blocked by the switch

- Switch attempts an EAPOL message exchange with phone. If phone is 802.1x capable, perform authentication using EAPOL exchange (See Figure 3). If not capable, collect identity credential, such as MAC address, from device.

- Switch passes identity information for phone to AAA server to determine whether identity is authorized for a particular VLAN

- AAA Server returns information regarding which VLAN phone is authorized to use and an indication that authorized device is an IP phone. The switch adds a binding between the phone and the data VLAN and a binding between the phone and the voice VLAN

- Phone continues to send untagged DHCP traffic which now goes through the access port on the data VLAN to the DHCP server

- DHCP response, which will not only contain the IP address information but also the VLAN identifier, is relayed to the phone

- The IP phone now starts tagging its packets with the same voice VLAN that was received in the DHCP response

- As soon as the voice VLAN starts to receive tagged packets from an authorized phone, it removes the binding entry for the data VLAN.

*Figure 2B*

① - PC sends out untagged packet, e.g., DHCP request, which is blocked by the switch ② - Switch attempts an EAPOL message exchange with PC. If PC is 802.1x capable, perform authentication using EAPOL exchange (See Figure 3). If not capable, collect identity credential, such as MAC address, from device.

③ - Switch passes identity information for PC to AAA server to determine whether identity is authorized for a particular VLAN ④ - AAA Server returns information regarding which VLAN PC is authorized to use. The switch adds a binding between the PC and the data VLAN ⑤ - PC continues to send untagged DHCP traffic which now goes through the access port on the data VLAN to the DHCP server. PC can then send tagged data on this same data VLAN.

| Entry | Port | Source MAC | VLAN | Action |
|---|---|---|---|---|
| N-2 | 1 | A | 1 | Allow |
| N-1 | 1 | B | 2 | Allow |
| N | 1 | Any | Any | Drop |

APPARATUS AND METHODS FOR AUTHENTICATING VOICE AND DATA DEVICES ON THE SAME PORT

BACKGROUND

The present invention relates to point-based network access control. More particularly, it relates to authentication and authorization of a device attached to a local area network (LAN) via an access control port in order to provide such network access.

A LAN may be set up to allow an unauthorized device to attach to the LAN infrastructure or an unauthorized user to attempt to access the LAN through a device that is attached to the LAN. For example, a business corporation may allow an outside visitor to connect to the corporation LAN. When an unauthorized user or device is allowed to attempt LAN connectivity, access may be restricted so that only particular authorized users and/or devices may utilize particular services offered by the LAN. That is, some form of network access control is typically implemented when providing LAN connectivity for unauthorized users and devices.

The 802.1X protocol describes a mechanism for providing network access control, and this protocol is described in "DRAFT Standard for Local and Metropolitan Area Networks—Port Based Access Control (Revision), IEEE P802.1X-REV/D11, Jul. 22, 2004, which document is incorporated herein by reference in its entirety. The 802.1X protocol describes a port-based network access control that makes use of the physical access characteristics of IEEE 802 Local Area Networks (LAN) infrastructures in order to provide a way of authenticating and authorizing a device attached to a LAN port that has point-to-point connection characteristics, and of preventing access to that port in cases in which the authentication and authorization process fails. The 802.1X protocol currently assumes a single device is plugged into a port and, thereby, only supports one supplicant per port.

BRIEF DESCRIPTION OF THE DRAWINGS

The present invention is illustrated by way of example, and not by way of limitation.

DESCRIPTION OF EXAMPLE EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Overview

In one embodiment, a method is disclosed. A first non-domain packet that does not specify a domain is received from a first device. A first authentication packet is sent to the first device to thereby attempt a first authentication process for allowing the first device to access a network via a particular access port. If the first device cannot participate in the first authentication process, the following operations are performed: (i) if the first device or a user of the first device is authorized to access a voice first domain, forming a first binding between an identity of the first device and the first domain, wherein the first binding specifies that the first device is allowed to access the first domain; (ii) if the first device or the user of the first device is authorized to access the voice first domain and if the first device is determined to be a voice type device and if the first device is not aware of the first domain yet, forming a second binding between the identity of the first device and a data second domain, wherein the second binding specifies that the first device is allowed to access the second domain; (iii) if the first device or the user of the first device is authorized to access the data second domain, forming a third binding between the identity of the first device and the second domain, wherein the third binding specifies that the first device is allowed to access the second domain; and (iv) if a first domain packet that specifies the first domain is received from the first device, removing the second binding if it is present. If the first device can participate in the first authentication process, performing operations (i) through (iii) only if the authentication process succeeds for the first device. In other embodiments, the invention pertains to an apparatus having one or more processors and one or more memory, wherein at least one of the processors and memory are adapted for performing the above described method operations.

Specific Example Embodiments

In general, example embodiments of the present invention allow authorization for a particular device or user to have access into a particular network so as to be bound to a specific domain or VLAN (virtual local area network). When authorization is tied to a domain, several devices can be authenticated into a single physical port of a network access device (e.g., access switch) and still only be given access to the one or more domain(s) or VLAN(s) that they are authorized to access based on their individual independent authorization outcomes.

Figure 1:
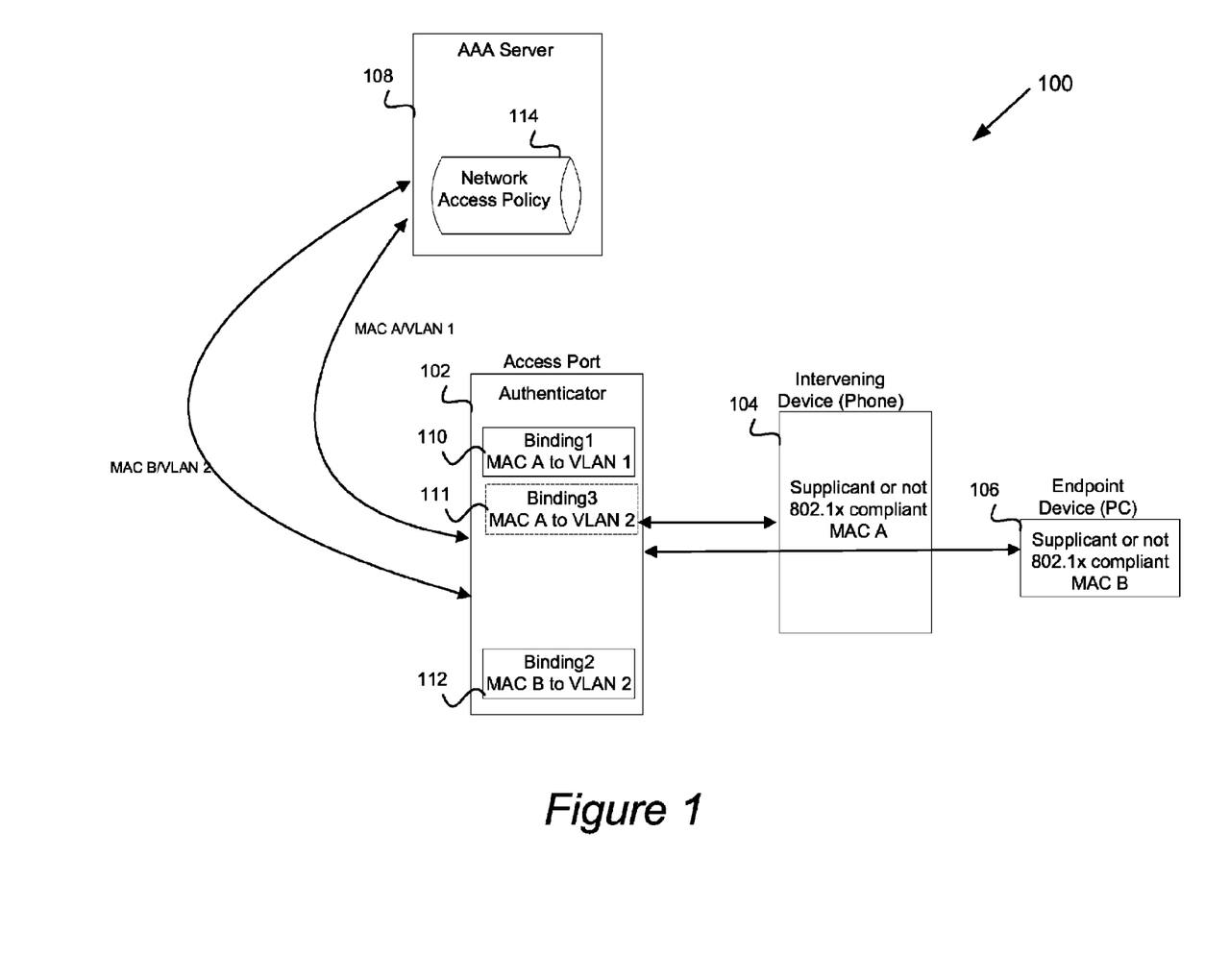
FIG. 1 illustrates a network portion in which domain authorization embodiments of the present invention may be implemented.

Techniques for domain- or VLAN-dependent authorization on a single port may be implemented in any suitable manner and depends on the particular protocols and/or applications being utilized by the particular network access device. FIG. 1 illustrates a network portion 100 in which domain authorization embodiments of the present invention may be implemented. In this configuration, two devices are chained together and one of the devices is coupled to an access port 102 of a network device, such as an access switch (not shown). For instance, an endpoint device or personal computer (PC) 106 is coupled to an intervening device or VoIP (voice over internet protocol) phone 104, which is coupled to the access port 102. Of course, the PC 106 may serve as the intervening device, instead of the IP phone 104. In general, any type of device may be utilized as an intervening or endpoint device. Additionally, more than two chained devices may also be contemplated if more than two domains or VLAN's are provided through such access port 102 or if some of the devices are authorized to use some of the same domains. Other configurations, such as a plurality of devices coupled in a ring, star, or star bus pattern, or in parallel to the access port, or one or more devices using wireless port access, are also contemplated. Finally, although a VoIP phone is used to illustrate certain aspects of the invention, any suitable VoIP device, such as an IP phone or IP modem, may also be used to practice various embodiments of the present invention.

In the illustrated example, the access port 102 is configured to determine domain or VLAN access for a plurality of devices with or without using an authentication protocol, such as the protocol 802.1X or any other suitable authentication protocol. Devices that are participating in an 802.1X authentication process are referred to as "supplicant" and "authenticator", and use of these terms is not meant to limit the scope of the invention to this particular protocol. A supplicant generally obtains or attempts to gain permission from an authenticator to gain access to a particular network, such as a local area network. In embodiments of the present invention, a supplicant can seek permission from an authenticator to gain access to a network, resulting in the device being authorized to access a particular domain or VLAN. In the illustrated example, access port 102 can serve as an authenticator while each device 104 and 106 may be configured to act as a supplicant to gain access to two respective VLAN's: a voice VLAN 1 and a data VLAN 2, respectively. One or both of the devices 104 and 106 may not be compliant with the authentication protocol 802.1X. If a device is not compliant with the 802.1X authentication protocol, the access port is also operable to authorize such a device to gain access to a particular domain or VLAN. For instance, even if one or both devices 104 and 106 are not 802.1X compliant, the access port can authorize one of the devices to access a voice VLAN, while authorizing the other device to access another data VLAN.

802.1X Authentication-Compliant Devices

An example application of the present invention in which an 802.1X authentication process is implemented by both devices 104 and 106 will first be generally described. In this example, example embodiments of the inventive techniques as applied to 802.1X authentication compliant devices will be described at a high level, while example implementation details are described further below. In the illustrated example, VoIP phone 104 can authenticate into the voice VLAN 1 by implementing an 802.1X supplicant. The phone can also provide "pass-through" connectivity for downstream device 106 before or after the phone has authenticated into the network. The downstream device can authenticate into the data VLAN 2 by also implementing 802.1X. In this example, endpoint device 106 has a media access control (MAC) address "MAC B", while intervening device 104 has MAC address "MAC A." Intervening device 104 authenticates with the access port 102 to obtain access to the voice VLAN 1, while endpoint device 106 authenticates with the access port 102 to obtain access to the data VLAN 2. During authentication of intervening device 104, a binding may be formed between MAC A and VLAN 1 in the form of Binding1 110. Likewise, a binding (Binding2 112) may be formed between MAC B and VLAN 2 for authentication of endpoint device 106. These two binding may be integrated together into an access control list (ACL), MAC Address Table, or any suitable data structure for indicating whether a binding can be dropped or forwarded. Authentication for both devices 104 and 106 may be authorized by an authentication, authorization, and accounting (AAA) server 108 based on a network access policy 114 or preconfigured in the access port 102 or network device (e.g., switch) so as to be accessible to the port 102.

Authenticating two different devices into two different VLAN's on the same access port may be accomplished by any suitable manner. For instance, the supplicant may directly or indirectly request authentication on a certain VLAN. In a direct request, the supplicant sends a request to access a specific VLAN. That is, the request includes a field specifying a VLAN that the requesting device is attempting to access. In an indirect request, the supplicant does not specify the VLAN for which it is seeking authorization, and the supplicant's VLAN is preconfigured in the AAA server or access port based on the supplicant's identity, e.g., MAC address. The later example would work well in current embodiments of the 802.1X protocol, where a supplicant does not specify a VLAN during an authentication procedure.

Figure 2A:
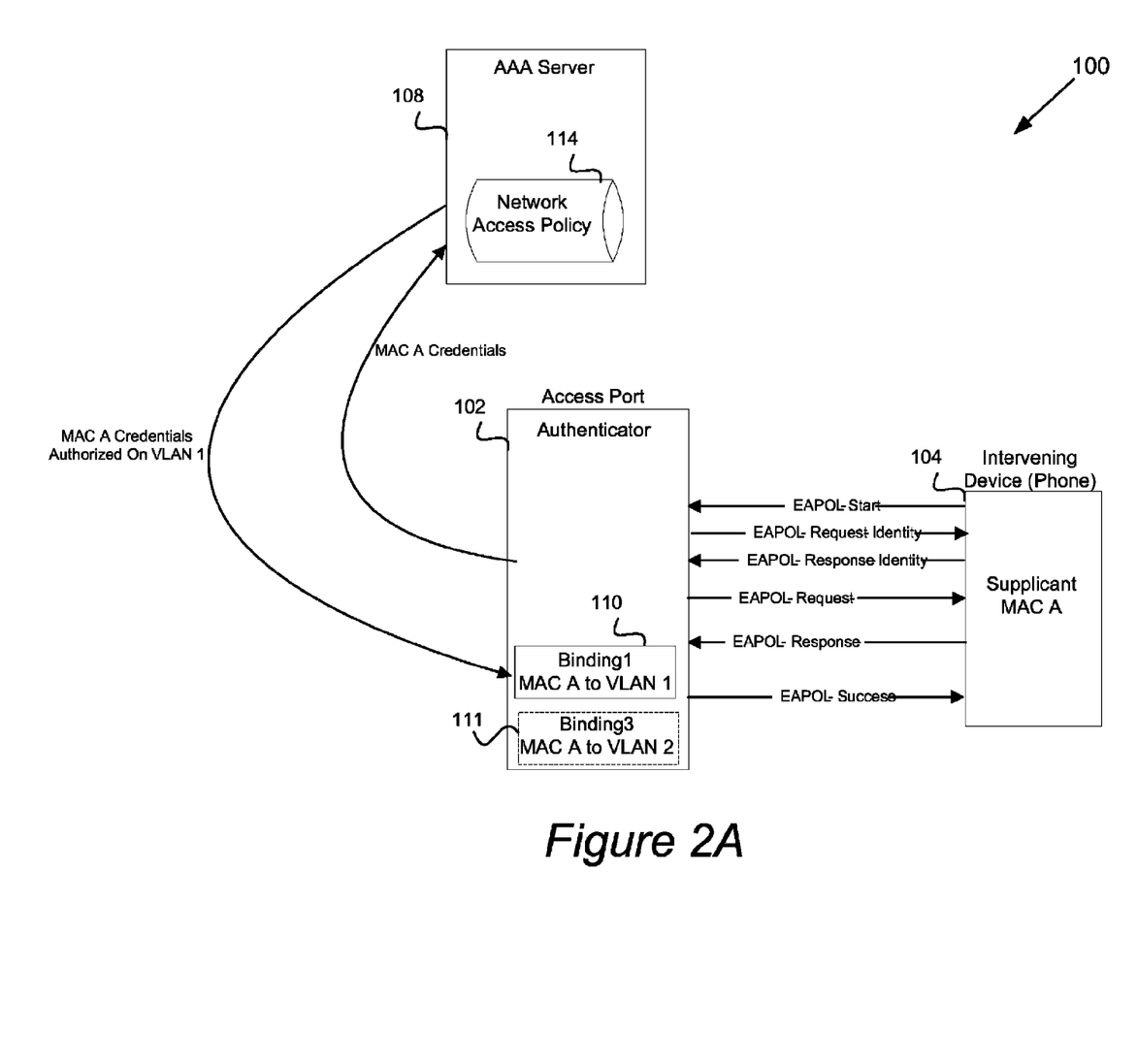
FIG. 2A illustrates an example message exchange between the intervening device and the access port of FIG. 1.

FIG. 2A illustrates an example message exchange between the intervening device 104 and the access port 102 of FIG. 1. In this example, 802.1X messages are exchanged during authentication of the intervening device 104, and during such exchange the access port in configured to set up permission for the supplicant 104 to access VLAN 1 through access port 102. A similar message exchange may occur for authentication of the endpoint device 104 with the intervening device 104 passing such messages between the endpoint device 104 and the access port.

This message exchange generally takes place between a supplicant port access entity (PAE), e.g., the endpoint device or the intervening device, and the authenticating PAE, e.g., the access port. The packet format that is applied to 802.1X packets during this authentication process is referred to as "extensible authentication protocol (EAP) over LAN" or EAPOL. Of course, other authentication formats are also contemplated.

In an EAPOL message exchange between a supplicant and authenticator, either the supplicant or the authenticator may initiate the exchange. In the present example, the supplicant, i.e., intervening device 104, initiates by sending an EAPOL-Start packet to the access port or authenticator 102. As shown, the authenticator 102 then sends an EAPOL-Request Identity packet to obtain an identity of the supplicant. The identity of the supplicant is returned to the authenticator by the supplicant in an EAPOL-Response Identity packet. Further EAPOL-Request packets and EAPOL-Response packets may be exchanged between the supplicant and authenticating entity to authenticate and authorize the client.

During the EAPOL message exchange, the authenticator may determine whether the supplicant is authorized for accessing a particular VLAN in any suitable manner. For example, the access port 102 may be configured with information indicating which supplicant devices are authorized to access which VLAN or may obtain such information from any suitable source. In the illustrated example, the access port or authenticator 102 sends the supplicant's credential information to the AAA server 108 and then receives information indicating that the supplicant/MAC A is authorized to access VLAN 1. That is, the supplicant's MAC address is matched to a VLAN. Of course, any other identifying information associated with the supplicant may be matched to a particular VLAN. A binding between the supplicant (e.g., MAC A) and authorized VLAN may then be formed. In contrast, if the supplicant is not authorized for any VLAN, the AAA Server 108 may indicate that the supplicant is not authorized and a binding for the supplicant is not formed.

The AAA server may also indicate whether the supplicant (or a device that is not 802.1X capable) is a voice device (e.g., by sending a string that specifies a voice type device). When the supplicant is a voice device, it may also be determined whether the supplicant is aware of its own voice VLAN. The supplicant may be aware of its own voice VLAN by previously participating in a discovery process, such as a CDP (Cisco Discovery Protocol) or an LLDP-MED (Link Layer Discovery Protocol-Media Endpoint Discovery) process, with the switch. Accordingly, the switch may be configured with information regarding devices that have discovered their own VLANs. If a supplicant that is a voice device has not participated in a VLAN or domain discovery process to determine its voice VLAN, a third binding 111 between the supplicant and the data VLAN 2 may be formed temporarily for the supplicant to use until the supplicant becomes aware of its voice VLAN, as explained further herein. When a supplicant is unaware of its VLAN, its packets are untagged and do not specify a VLAN. Untagged packets may be sent by default to the data VLAN. Accordingly, this third binding 111 may be utilized by the voice supplicant to communicate untagged packets in the data VLAN 2 (e.g., with a dynamic host configuration protocol or DHCP server) to thereby determine its voice VLAN 1. If the supplicant had discovered its own voice VLAN prior to authentication, the third binding 111 need not be created since the supplicant can tag its packets with its voice VLAN 1 and does not have to leave its packets untagged.

The intervening device 104 may also be configured to forward packets addressed with the 802.1X multicast address to both the endpoint device (or any other devices that are chained to it) and to the internal management port of the intervening device. The supplicant devices may generally send their EAPOL messages to the 802.1X multicast address. However, the messages sent by the authenticator after the initial EAPOL-Request Identity message may be sent to the supplicant's unicast address since the 802.1X protocol may not provide an addressing schema and may assume a point-to-point connection between a single authenticator/supplicant pair.

802.1X Authentication-Noncompliant Devices

The case in which an 802.1X authentication process is not implemented by one or both devices 104 and 106 will now be generally described. In a noncompliant case, one or both devices may implement another authentication protocol, besides 802.1X or one or both devices may not implement any type of authentication protocol. Additionally, a particular access port may be configured (directly or indirectly by an AAA server) to authorize access to any number and type of domains or VLANs for any number and type of devices.

Referring to FIG. 1, the VoIP phone 104 and/or endpoint device 106 may be authorized to access a particular domain or VLAN in any suitable order. If the VoIP phone 104 has not discovered its own voice VLAN, a third binding 111 between the phone 104 and the data VLAN 2 may be temporarily formed after the access port determines that phone 104 is authorized to access VLAN 1 and that the device 104 is a voice device (e.g., from the AAA server). The third binding may be formed so that the VoIP phone 104 may communicate with one or more server(s) (e.g., a Dynamic Host Configuration Protocol (DHCP) server) via the data VLAN 2 to obtain its authorized domain or VLAN, e.g., VLAN 1. The access port may form this third binding in addition to forming the first binding 110 between the phone 104 and the voice VLAN 1 although formation of the first binding 110 for the voice VLAN 1 may be delayed until after the phone 104 begins to use the voice VLAN 1. The bindings (e.g., 110, 111, and 112) formed for non-compliant (as well as compliant) devices may take any suitable format, such as the format described below with respect to FIG. 4.

Prior to obtaining its own VLAN (e.g., voice VLAN 1), the VoIP phone 104 may send untagged packets that do not specify a VLAN on which it is attempting access. In certain configuration, these untagged packets will, by default, be directed towards the data VLAN, e.g., VLAN 2. After the VoIP phone 104 obtains its VLAN 1, it then sends packets specifying this obtained VLAN 1. When the access port receives the first packet from the VoIP phone 104 specifying the voice VLAN 1 and the phone 104 has already been authorized to utilize VLAN 1, the third binding between the VoIP phone 104 and the data VLAN 2 may be removed if not already removed and the first binding 110 for the voice VLAN 1 may then be formed. The first binding 110 may have been formed at the same time as the third binding 111 so as to not cause any transitioning delays for the VoIP phone 104 to use such first binding 110.

If the endpoint device 106 is also determined to be non-compliant with 802.1X and the endpoint device 106 is also determined to be authorized to access a data VLAN 1, the second binding 112 between the endpoint device 106 and VLAN 1 is formed. As described above in the 802.1X section, the access port may then allow the endpoint to access VLAN 1 based on this second binding 112.

Figure 2B:
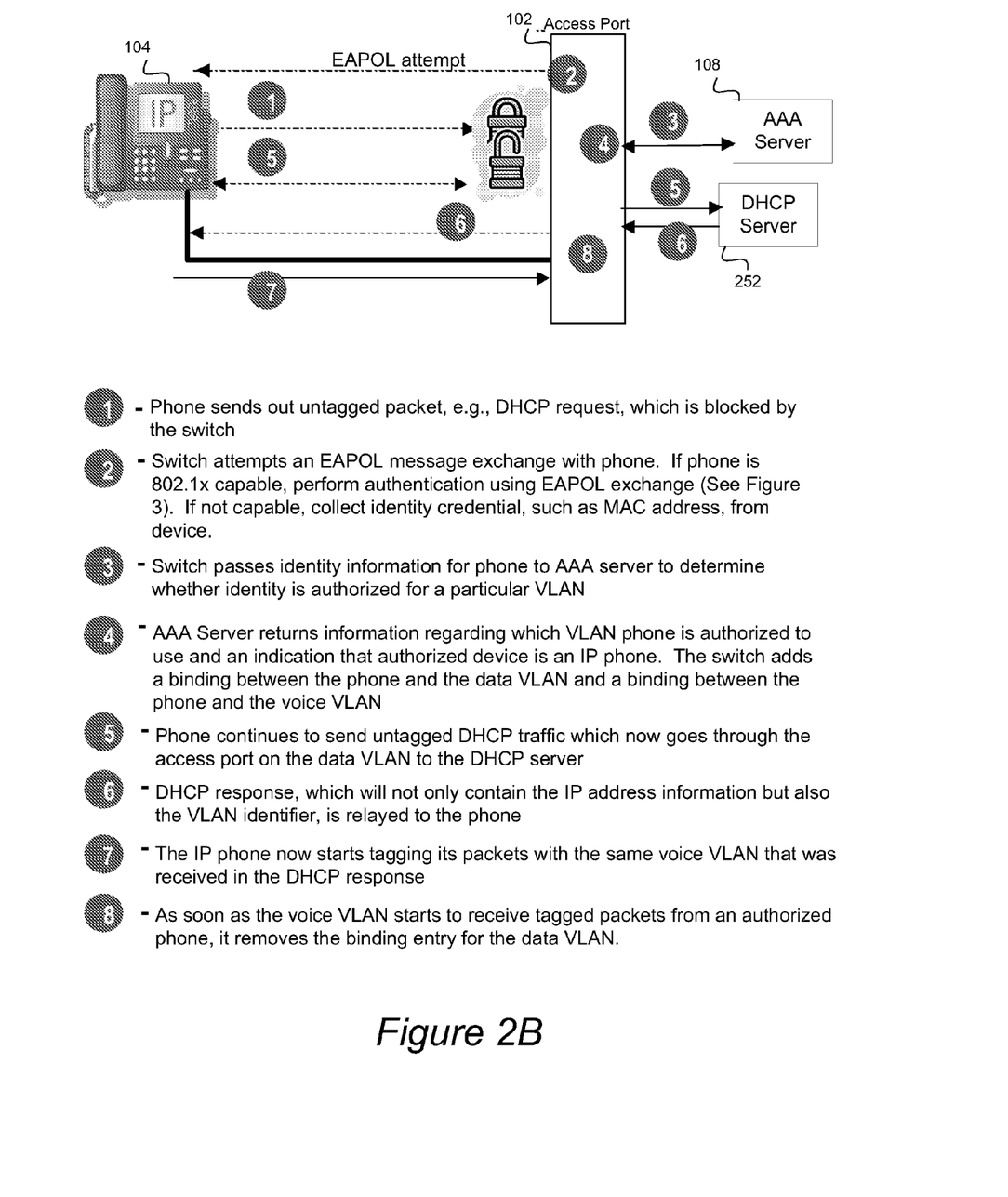
FIG. 2B illustrates a process for authorizing a device to access a voice domain or VLAN, regardless of the authentication protocol utilized or not utilized by the device, in accordance with one embodiment of the present invention.
Figure 2C:
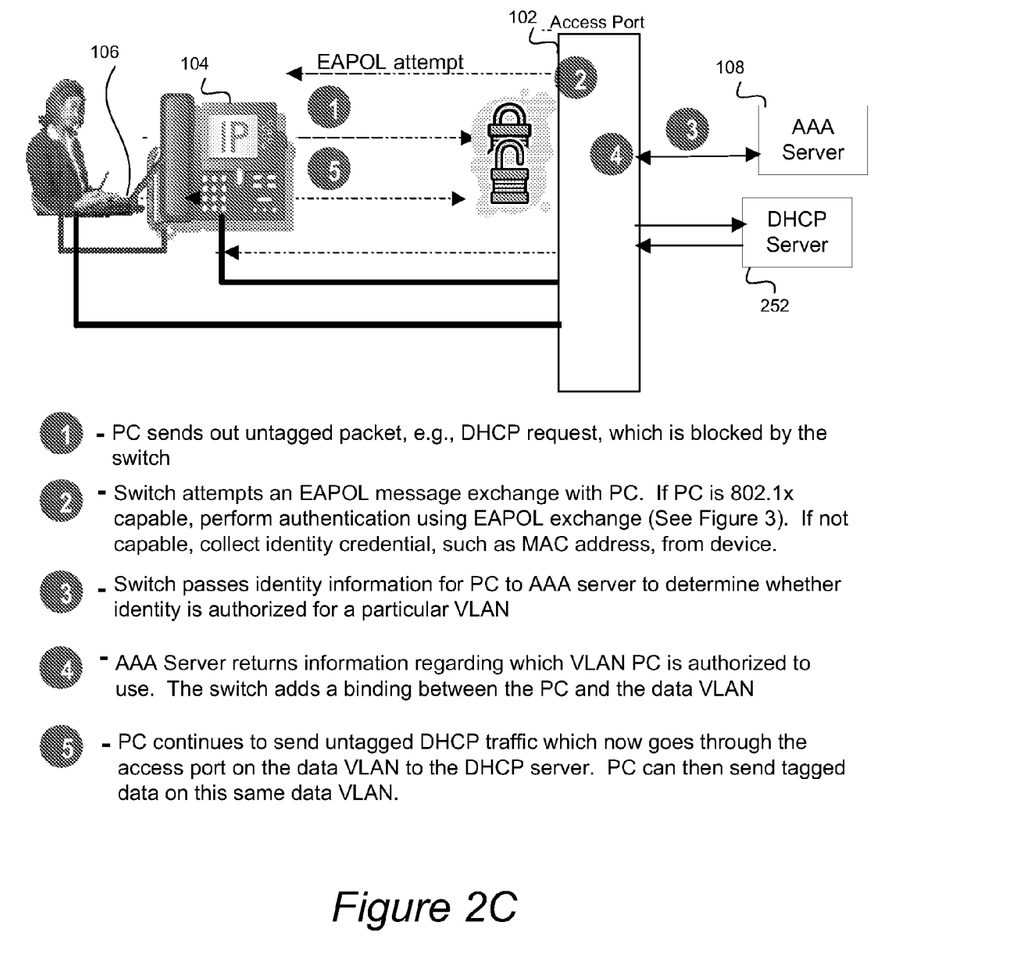
FIG. 2C illustrates a process for authorizing a device to access a data domain or VLAN, regardless of the authentication protocol utilized or not utilized by the device, in accordance with one embodiment of the present invention.

FIGS. 2B and 2C illustrate a process for determining whether devices are authorized to access a particular domain or VLAN, regardless of the authentication protocol utilized or not utilized by the devices, in accordance with one embodiment of the present invention. In this example, a 802.1X non-compliant VoIP phone 104 is authorized first in FIG. 2B, and then a 802.1X non-compliant PC device is authorized in FIG. 2C although techniques of the present invention may authorize devices in any suitable order. A VoIP phone 104 is used to illustrate example techniques of the present invention although any suitable voice device, such as an IP phone or Voice over IP modem, may be utilized. Referring to FIG. 2B, VoIP phone 104 initially sends out an untagged packet to the access port, which is blocked by the switch, in operation (1). For example, the VoIP phone 104 sends a DHCP request to a DHCP server 252 in order to obtain an IP address. By way of another example, the VoIP phone 104 attempts to initiate an authentication process that is not compliant with 801.1X.

The switch 102 then attempts an EAPOL message exchange with the VoIP phone 104 in operation (2). Additionally, if the phone is 802.1X capable, authentication is performed using an EAPOL message exchange, such as described below with respect to FIG. 3. Other authentication procedures besides 802.1X may be attempted at this point also as described further in FIG. 3. If the phone is not 802.1X capable, the switch collects identity information, such as the MAC address, from the VoIP phone in operation (2). Collection of identity information may be accomplished in any suitable manner, such as obtaining the identity information from the untagged packet received from the VoIP Phone. The switch then passes this identity information (e.g., MAC A) for the VoIP phone 104 to the AAA server 108 to determine whether the identity is authorized for a particular VLAN or domain in operation (3). If the phone is authorized for a particular VLAN, the AAA server 108 returns information regarding which VLAN the phone is authorized to use and may also return an indication that the authorized device is an IP phone (or voice device) in operation (4). Otherwise, the AAA server indicates that the device 104 is not authorized to access any VLAN or domain and the authorization process may end for such device 104.

If the VoIP phone 104 has been authorized to access the voice VLAN 1, the switch may also add a binding between the phone and the data VLAN 2 and a binding between the phone and the voice VLAN 1 in operation (4). In the meantime, the phone 104 continues to send untagged traffic (e.g., DHCP packets), which now are authorized to pass through the access port 102 on the data VLAN 1 to the DHCP server 108, for example, in operation (5). In operation (6), a DHCP response, which contains IP address information and a VLAN identifier, is relayed to the phone. The phone 104 can now start tagging its packets with the same voice VLAN that was received in the DHCP response in operation (7). As soon as the voice VLAN starts to receive tagged packets from an authorized phone, the access port may then remove the binding entry for the data VLAN 2 and the phone 104 and may also add a binding entry for the phone 104 and the voice VLAN 2 in operation (8). Alternatively, the binding for the voice VLAN 1 may be created along with removal of the data VLAN 1 in operation (8) instead of creating the voice binding in operation (4). However, the data and voice bindings are preferably formed together so as to provide a hitless transition for the voice device from the moment it is able to start sending packets on the voice VLAN. Otherwise, packets sent on the voice VLAN may be dropped until the voice VLAN is created.

FIG. 2C illustrates an authorization procedure for a 802.1X non-compliant device to access a data VLAN through an access port. The PC device 106 is used to illustrate example techniques of the present invention. However, these techniques may be applied to any suitable type of devices that would utilize a data VLAN, such as a printer, facsimile device, etc. As shown, the PC 106 initially sends out an untagged packet, e.g., a DHCP request, which is blocked by the switch in operation (1). The switch then attempts an EAPOL message exchange with the PC 106 in operation (2). If the PC is 802.1X capable, authentication is performed using an EAPOL message exchange (for instance, see FIG. 3). If the PC is not 802.1X compliant, the switch collects identity information for the PC in operation (2) and then passes the identity information for the PC to the AAA server 108 to determine whether the identity is authorized for a particular VLAN in operation (3). The AAA server then returns information regarding which VLAN the PC is authorized to use if there is such a VLAN in operation (4). In this example, the data VLAN 1 is returned. The switch also add a binding entry between the PC (e.g., MAC B) and the data VLAN in operation (4).

This binding between the PC and the data VLAN will work for the PC when it sends packets that are untagged, as well as packets that are tagged with the data VLAN. Accordingly, the PC can continue to send untagged DHCP (or other untagged packets) traffic, which now goes through the access port onto the data VLAN 2 to the DHCP server. The PC can also send tagged packets that specifies the data VLAN 2 onto this same data VLAN 2 (e.g., after the PC obtains the VLAN 1 from the DHCP server).

Figure 3:
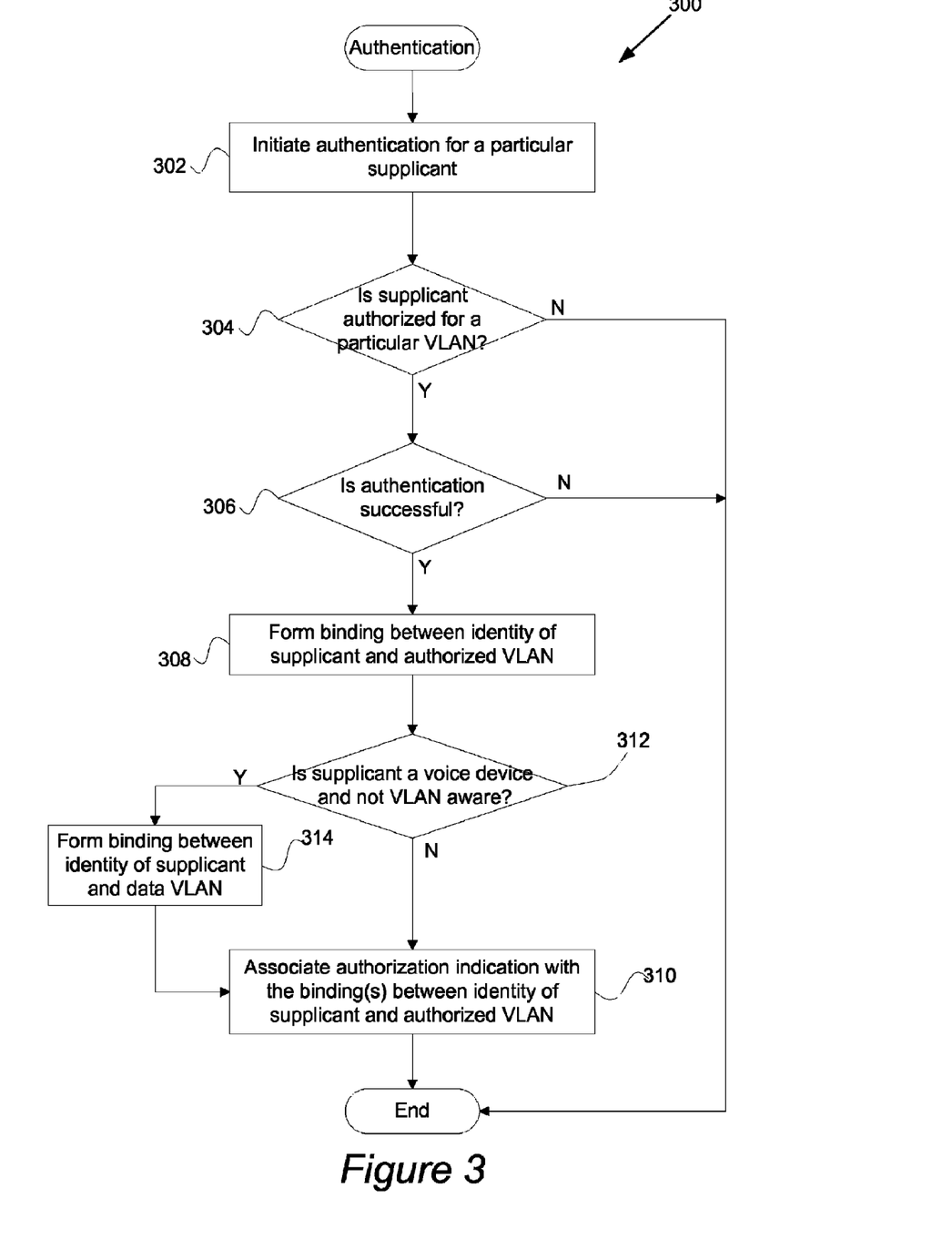
FIG. 3 is a flow chart illustrating an authentication procedure in accordance with one embodiment of the present invention.

FIG. 3 is a flow chart illustrating an authentication procedure 300 in accordance with one embodiment of the present invention. This authentication procedure 300 may be repeated for any number of supplicants and may also be repeated for a same supplicant. That is, the access port may be configured to periodically re-authenticate each authorized device. Referring to FIG. 3, authentication is initiated for a particular supplicant in operation 302. The authenticator or access control port or the supplicant may initiate such process. For instance, when a device is coupled to the access port and enabled, the enabled device may inform the access control port that it is enabled. In response to this enablement, the authenticator may initiate the authentication process by sending an EAPOL-Request Identity packet, for example. Additionally, the procedure 300 of FIG. 3 may be initiated after a device sends an untagged packet and the access port attempts an EAPOL message exchange to which the device then responds. Alternatively, the newly enabled device may initiate an 802.1X authentication after it starts up or is enabled (e.g., by sending an EAPOL-Start). If the device is not 802.1X compliant, an alternative authentication process may instead be initiated to exchange any suitable type of credentials with the supplicant.

It may then be determined whether the supplicant is authorized to access a particular VLAN in operation 304. For instance, the authenticator obtains information from an AAA server indicating whether the supplicant is authorized for a particular VLAN. In one example preconfiguration of the AAA server (or access control port), an IP phone device is matched with a voice VLAN, while a PC device is matched with a data VLAN. If the supplicant is not authorized for a particular VLAN, the authentication procedure may end. Alternatively, the supplicant may be proactively blocked from accessing all VLAN's available through the access port. In one embodiment, the access port is pre-configured to block all devices from accessing or ingressing onto all VLAN's until a particular supplicant is authenticated.

When a particular supplicant is determined to be authorized for a particular VLAN, it may also be determined whether authentication is successful for the current supplicant in operation 306. For example, the authenticator carries out any suitable authentication or credential validation procedures, such as password or certification verification, in addition to authorizing the supplicant with respect to a particular VLAN. Of course, the authentication of the supplicant with a certain VLAN may take place after all other credentials have been authenticated or at any point during or after such authentication of other credentials. If authentication is not successful, the procedure may end.

Figure 4:
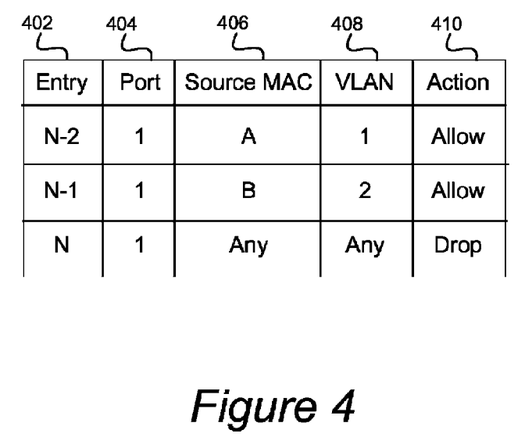
FIG. 4 illustrates one example of a data structure for indicating access control for one or more devices on a per VLAN basis with respect to a particular access control port in accordance with a specific implementation of the present invention.

If authentication is successful, a binding between the identity of the supplicant and the authorized VLAN may be formed in operations 308. It may then be determined whether the supplicant is a voice device and aware of the voice VLAN in operation 312. It may be determined whether the supplicant is a voice device in any suitable manner, e.g., by information indicating whether a particular device is a voice device being received from the AAA server. A device may obtain its authorized VLAN in any suitable manner, e.g., the device may be configured with its authorized VLAN or via the protocol CDP (Cisco Discovery Protocol) or LLDP-MED (Link Layer Discovery Protocol-Media Endpoint Discovery). When a discovery process has occurred for example between a device and the switch, information, regarding which devices have performed discovery, is retained and accessible by the switch. Accordingly, the switch can then determine that the supplicant is aware of its voice VLAN by assessing whether discovery information is maintained for the supplicant. When the supplicant is a voice device and is not aware of its VLAN, a binding between the identify of such supplicant and the data VLAN (e.g., VLAN 2) may also be formed in operation 314. Otherwise, this operation is skipped. An authorization indicator may then be associated with such one or more binding (s) in operation 310 and the procedure ends. Any type of associative structure may be utilized to indicate that a particular authenticated supplicant is now authorized to access a particular VLAN through a particular access control port. FIG. 4 illustrates one example of a data structure for indicating access control for one or more devices on a per VLAN basis with respect to a particular access control port in accordance with a specific implementation of the present invention. This data structure serves to filter ingressing packets so as to allow access for particular devices on specific VLANs, while blocking other ingressing packets. Such a data structure may be implemented in any suitable manner, e.g., via software or hardware, such as a ternary CAM (content addressable memory) or TCAM, or MAC Address Table.

As shown for each entry, the data structure of FIG. 4 includes an entry identifier 402, a port identifier 404, a source MAC address 406, a VLAN identifier 408, and an action 410 that specifies the action to be performed for a packet having the specified MAC address and VLAN. In the example of FIG. 4, an entry specified by "N" for Port 1 may specify that any ingressing packets identified by any MAC address for any VLAN is dropped. After intervening device and endpoint device of FIGS. 1, 2, and 5 authenticates for accessing VLAN 1 and 2, respectively, an entry N-1 is created for Port 1 that specifies that a device having MAC A is allowed to access VLAN 1. Likewise, an entry N-2 is created for Port 1 that specifies that a device having MAC B is allowed to access VLAN 2.

There may be situations in which packets from a particular device are processed by the switch prior to the device being authenticated. For example, when a device is not 802.1X compliant, the switch may collect credential information (e.g., MAC address) from the non-compliant device during a discovery process or when the non-compliant device sends untagged packets to the switch. Thus, packets from such a device would not be dropped, but sent to a process in the switch for collecting credentials and initiating authentication for such device. Once the switch has collected the credential information, such as the device's MAC address, from a device, the device's packets can be dropped until a binding has been formed for such device.

Figure 5:
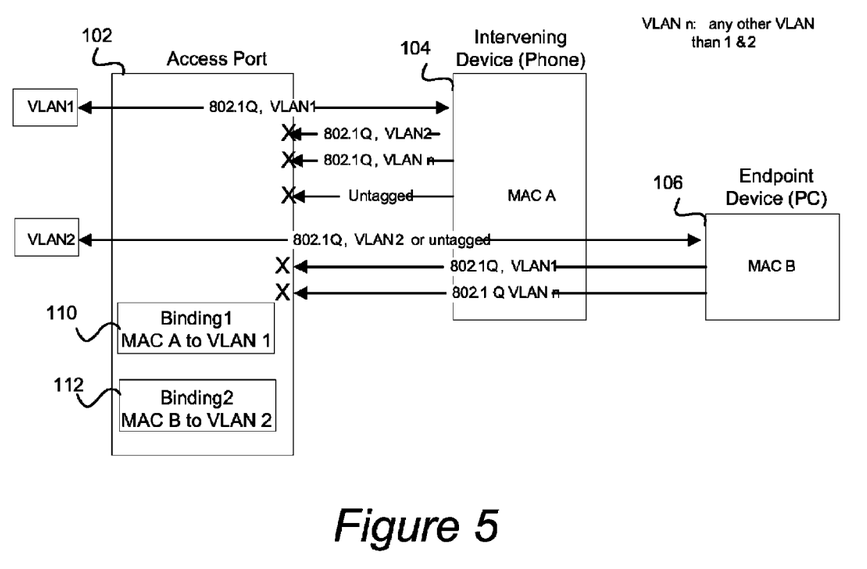
FIG. 5 illustrates mechanisms for providing port access control for a plurality of devices based on the data structure of FIG. 4.
Figure 6:
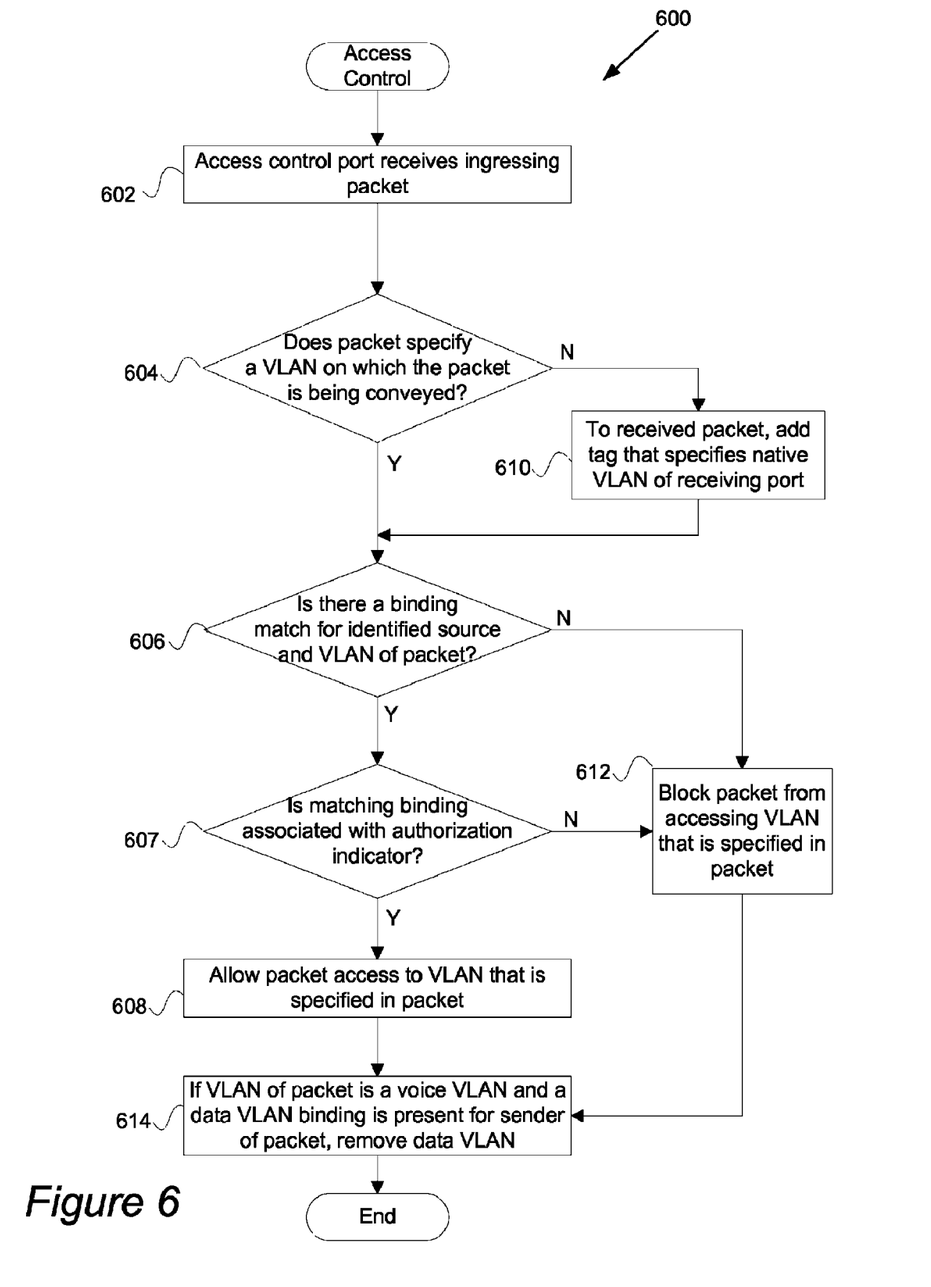
FIG. 6 is a flow chart illustrating a port access control procedure in accordance with one example embodiment of the present invention.

FIG. 5 illustrates mechanisms for providing port access control for a plurality of devices based on the data structure of FIG. 4. FIG. 6 is a flow chart illustrating a port access control procedure in accordance with one example embodiment of the present invention, and FIGS. 5 and 6 will be described together to clarify embodiments of the present invention. Initially, an access control port, such as port 102, receives an ingressing packet in operation 602. That is, a device, such as intervening device 104 or endpoint device 106, is attempting to access a VLAN through access port 102. For example, IP phone 104 or PC 106 may attempt to communicate with another IP phone or PC on a VLAN via access port 102.

Some of the ingressing packets will contain tagging (e.g., 802.1P/Q) that includes a VLAN on which the packet is being conveyed, while other packets will remain untagged. Although 802.1P/Q is used herein as an example tagging scheme, of course, the packets may be tagged to specify a VLAN using any suitable protocol. In the illustrated example, an endpoint device, such as a PC, may be unaware of 802.1P/Q tagging. However, this tagging allows the network infrastructure to route and provide Quality of Service (QoS) for different types of traffic through the network. Accordingly, endpoint devices may send untagged packets. The switch or network device's access port, which receives these untagged packets, may then add an 802.1P/Q tag. This added tag would include the native VLAN for the port which receives the packet. Typically, the switch can be configured on a port-by-port basis with a Native VLAN. Any untagged packet received on a particular port can then be tagged to include the native VLAN of such receiving port.

Referring to FIG. 6, after an ingressing packet is received, it may be determined whether the packet specifies a VLAN on which the packet is being conveyed, e.g., within an 802.1P/Q tag, in operation 604. A device may obtain its authorized VLAN in any suitable manner, e.g., the device may be configured with its authorized VLAN or via the protocol CDP (Cisco Discovery Protocol) or LLDP-MED (Link Layer Discovery Protocol-Media Endpoint Discovery). If a VLAN is not specified in the packet, a tag having the native VLAN may be added to the received packet in operation 610. If a VLAN is specified or after a tag is added, it may then be determined whether there is a binding match for the source (e.g., MAC address of sending device) and VLAN identified for the packet in operation 606. If there is a binding match found, it is then determined whether the matching binding is associated with an authorization indicator in operation 607. If there is no binding match or a found binding match does not have an authorization indicator, the packet is blocked from accessing the VLAN that is specified in the packet in operation 612. In effect, the packet is blocked from access any network associated with the access port. Otherwise, the packet is allowed access to only the VLAN specified in the packet in operation 608. If the VLAN of the packet is a voice VLAN and a data VLAN binding is present for the sender of such packet, the data VLAN is removed in operation 614. The procedure 600 may be repeated for any number of received packets that are attempting to ingress into a VLAN of the access port.

In the example of FIG. 5, the access port 102 is associated with a first binding 110 between MAC A and VLAN 1 and a second binding 112 between MAC B and VLAN 2. With this binding or ACL arrangement, only a packet (e.g., VoIP packet) that specifies VLAN 1 from intervening device 104 (MAC A) is allowed access to VLAN 1. In contrast, a packet that specifies a different VLAN (e.g., VLAN 2 or VLAN n) from the intervening device 104 (MAC A) or a VLAN other than VLAN2 (e.g., VLAN n) from the endpoint device 106 (MAC B) is blocked. A packet that specifies VLAN 1 from the endpoint device 106 (MAC B) is also blocked.

Similarly, only a packet that specifies VLAN 2 from endpoint device 106 (MAC B) is allowed access to VLAN 2. In contrast, a packet that specifies a different VLAN (e.g., VLAN 1 or VLAN n) from the endpoint device 106 (MAC B) or a VLAN other than VLAN 1 (e.g., VLAN n) from the intervening device 104 (MAC A) is blocked, and a packet that specifies VLAN 2 from the intervening device 104 (MAC A) is also blocked.

In both cases, untagged packets from the intervening device 104 (MAC A) (e.g., if the device does not support 802.1X) is also blocked from accessing VLAN 1 and 2. However, untagged packets from the endpoint device 106 (MAC B) will be accepted and placed on VLAN 2 when VLAN 2 is configured as the associated Native VLAN of the access port (as shown). Additionally, during the temporary formation of a binding between the intervening phone device 104 and data VLAN 2, untagged packets from the phone 104 are conveyed onto the data VLAN 2.

Generally, the techniques for implementing the present invention may be implemented on software and/or hardware. For example, these techniques can be implemented in an operating system kernel, in a separate user process, in a library package bound into network applications, on a specially constructed machine, or on a network interface card. In a specific embodiment of this invention, the techniques of the present invention are implemented in software such as an operating system or in an application running on an operating system.

A software or software/hardware hybrid packet processing system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the authentication systems of this invention may be a specially configured switch such as the Catalyst 6500, 4900, 4500, 3750, 3560, or Express 500 Series available from Cisco Systems, Inc. of San Jose, Calif. A general architecture for some of these machines will appear from the description given below. In an alternative embodiment, the system may be implemented on a general-purpose network host machine such as a personal computer or workstation. Further, the invention may be at least partially implemented on a card (for example, an interface card) for a network device or a general-purpose computing device.

Figure 7:
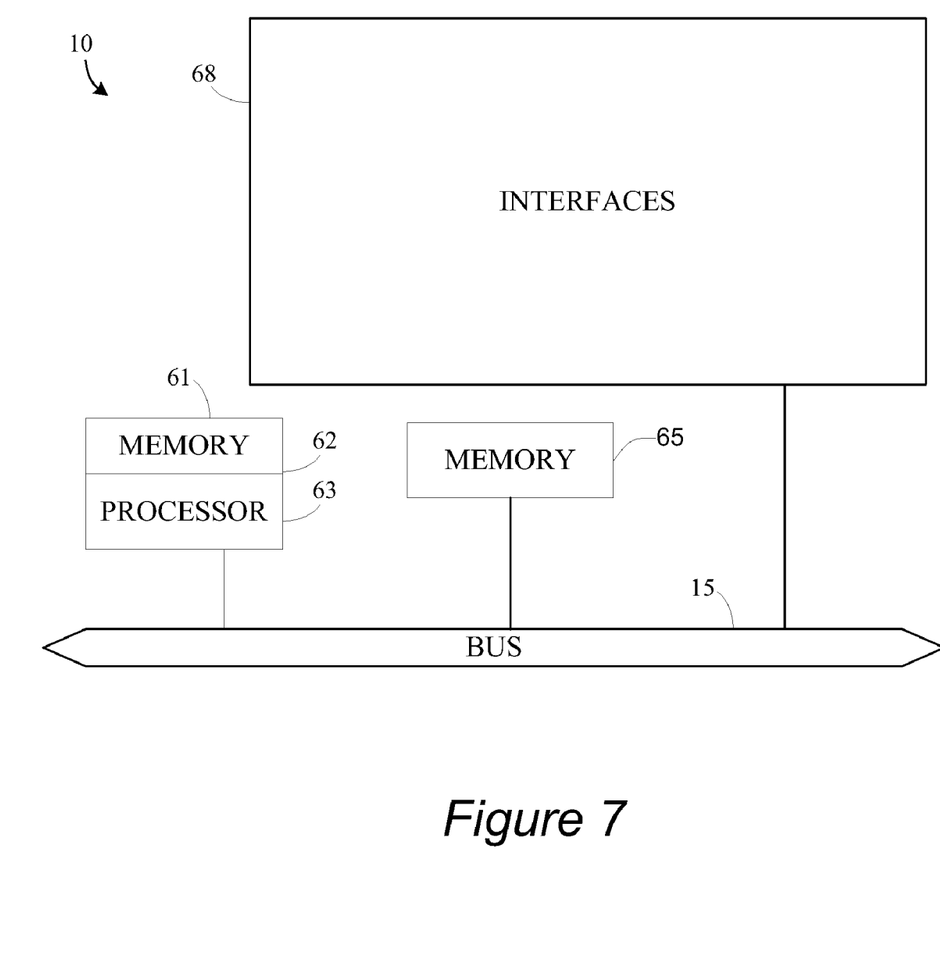
FIG. 7 illustrates an example switch suitable for implementing embodiments of the present invention.

Referring now to FIG. 7, a switch 10 suitable for implementing embodiments of the present invention includes a master central processing unit (CPU) 62, interfaces 68, and a bus 15 (for example, a PCI bus). When acting under the control of appropriate software or firmware, the CPU 62 is responsible for such tasks as switching and/or routing computations and network management. It preferably accomplishes all these functions under the control of software including an operating system (for example, the Internetwork Operating System (IOS®) of Cisco Systems, Inc.) and any appropriate applications software. CPU 62 may include one or more processors 63 such as a processor from the Motorola family of microprocessors or the MIPS family of microprocessors. In an alternative embodiment, processor 63 is specially designed hardware for controlling the operations of switch 10. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of packets or packet segments over the network and sometimes support other peripherals used with the switch 10. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching and/or routing, media control and management. By providing separate processors for the communications intensive tasks, these interfaces allow the master microprocessor 62 to efficiently perform switching and/or routing computations, network diagnostics, security functions, etc.

Although the system shown in FIG. 7 is one specific switch of the present invention, it is by no means the only switch architecture on which the present invention can be implemented. For example, an architecture having a single processor that handles communications as well as switching and/or routing computations, etc. is often used. Further, other types of interfaces and media could also be used with the switch.

Regardless of a network device's configuration, it may employ one or more memories or memory modules (such as, for example, memory block 65) configured to store data, program instructions for the general-purpose network operations and/or the inventive techniques described herein. The program instructions may control the operation of an operating system and/or one or more applications, for example. The memory or memories may also be configured to store VSAN information, ACL information, an indicator on whether a device is an VoIP phone, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Particular embodiments of the present invention allow more than a single device to have network access (e.g., LAN access) through a single physical, access control port while maintaining security mechanisms. A device can be allowed to be authorized on a per-VLAN or domain basis. Accordingly, filtering can be accomplished on a per-VLAN or domain basis through a single port. Additionally, embodiments of the present invention do not depend on a particular protocol, such as 802.1X or CDP or LLDP-MED being implemented by a device to gain access to a domain. However, when a device implements 802.1X, an 802.1X authentication process may be integrated with the domain based authorization process. Also, authorization of multiple devices may occur in any order, e.g., an intervening device does not have to be authorized prior to an endpoint device.

Embodiments of the present invention may also ensure that existing features such as Guest-VLAN and Auth-Fail VLAN continue to be supported for data devices while voice devices continue to be authenticated. Guest VLAN is used for non 802.1X capable devices that fail authentication, as a result the port is moved into the guest VLAN which to the host is a safe subnet for guest users of a network. The guest VLAN can continue to be supported. Auth Fail VLAN is used for 802.1X capable devices that fail authentication and is similar to Guest-VLAN.

Although the foregoing invention has been described in some detail for purposes of clarity of understanding, it will be apparent that certain changes and modifications may be practiced within the scope of the appended claims. For example, although authentication has been described as authorizing a single device for accessing a single domain, of course, a single device may be authorized to access a plurality of different domains or multiple devices may be authorized to access a same domain. Therefore, the present embodiments are to be considered as illustrative and not restrictive and the invention is not to be limited to the details given herein, but may be modified within the scope and equivalents of the appended claims.

What is claimed is:

1. A method comprising:
performing a first authentication process to authorize a first supplicant device coupled with an access port of a network device to access a first domain of a network via the access port of the network device, wherein the first authentication process is based on an identifier of the first supplicant device; and
performing a second authentication process to authorize a second supplicant device coupled with the access port to access a second domain of the network via the access port of the network device so that the access port is authorized to allow access to both the first domain by the first supplicant and the second domain by the second supplicant, wherein the first domain differs from the second domain, and wherein the second authentication process is based on an identifier of the second supplicant that differs from the first supplicant device's identifier, wherein the first and second authentication processes result in the first and second supplicant devices both being authorized at the same time to access their respective first and second domain via the access port,
wherein the first and second authentication process are performed by:
receiving a first non-domain packet from each of the first and second supplicant device that does not specify a domain from the first or second supplicant device, wherein the first non-domain packet for each of the first and second supplicant devices includes the identifier associated with the first or second supplicant device;
sending a first authentication packet to each first and second supplicant device to thereby initiate the first and second authentication process, respectively;
determining that the first and second authentication process for each of the first and second supplicant, respectively, has been successful;
determining that the first supplicant device is a voice type device and that the first supplicant device or the first supplicant's user is authorized to access the first domain that is assigned for voice and determining that the second supplicant device or the second supplicant device's user is authorized to access the second domain that is assigned for data;
(i) forming a first binding between the identifier of the first supplicant device and the first domain that is assigned for voice, wherein the first binding specifies that the first supplicant device is allowed to access the first domain and the first binding is associated with the access port of the network device;
(ii) forming a second binding between the identifier of the first supplicant device and the second domain that is assigned for data, wherein the second binding specifies that the first supplicant device is allowed to access the second domain and the second binding is associated with the access port of the network device;
viii) forming a third binding between the identifier of the second supplicant device and the second domain that is assigned for data, wherein the third binding specifies that the second supplicant device is allowed to access the second domain and the third binding is associated with the access port of the network device, wherein each of the first, second, and third bindings are formed without removing any of the other first, second, and third bindings; and
for the first supplicant device, receiving a first domain packet that specifies the first domain and removing the second binding for the first supplicant device without removing the first and third bindings.

2. A method as recited in claim 1, wherein the first and second authentication process each uses an 802.1x protocol.

3. A method as recited in claim 1, wherein it is determined that the first supplicant device is a voice type device by collecting the identifier of the first supplicant device, sending the identifier of the first supplicant device to an authorization server, and receiving from the authorization server, in response to the identifier of the first supplicant device, an indication that the first supplicant device is a voice type device, and the method further comprising receiving from the authorization server an indication that the first supplicant device is authorized to access the first domain in response to sending the identifier of the first supplicant device to the authorization server.

4. A method as recited in claim 1, further comprising:
if a second domain packet is received that is attempting to ingress into the first domain and the second domain packet matches the first binding if the first binding is present, allowing the second domain packet to access the first domain;
if a second domain packet is received that is attempting to ingress into the first domain and the second domain packet does not match the first binding or the first binding is not present, blocking the second domain packet from accessing the first domain;
if a second domain packet is received that is attempting to ingress into the second domain and the second domain packet matches the second or third binding if the second or third binding is present, allowing the second domain packet to access the second domain; and
if a second domain packet is received that is attempting to ingress into the second domain and the second domain packet does not match the second or third binding or the second and third binding are not present, blocking the second domain packet from accessing the second domain.

5. A method as recited in claim 1, wherein the operations (i) through (iii) are performed substantially in parallel.

6. A method as recited in claim 1, wherein operations (i) through (iii) are performed during different time periods.

7. A method as recited in claim 1, wherein the first domain is a first virtual local area network (VLAN) and the second domain is a second VLAN.

8. A method as recited in claim 1, wherein the first supplicant device is coupled to the access port and the second supplicant device is coupled to the first supplicant device in a chained arrangement with the access port, and the second supplicant device communicates with the access port via the first supplicant device.

9. A method as recited in claim 1, wherein the first suppli­cant device is authorized to access the first domain when an unauthorized user that is utilizing the first supplicant device is determined to be authorized to access the first domain.

10. A method as recited in claim 1, further comprising blocking any devices from accessing any domains that are not specified by any binding that specifies access to a particular domain.

11. An apparatus in the form of a network device compris­ing:
one or more processors;
one or more memory, wherein at least one of the processors and memory are configured for:
performing a first authentication process to authorize a first supplicant device coupled with an access port of the network device to access a first domain of a network via the access port of the network device, wherein the first authentication process is based on an identifier of the first supplicant device; and
performing a second authentication process to authorize a second supplicant device coupled with the access port to access a second domain of the network via the access port of the network device so that the access port is authorized to allow access to both the first domain by the first supplicant and the second domain by the second supplicant, wherein the first domain differs from the second domain, and wherein the second authentication process is based on an identifier of the second supplicant that differs from the first supplicant device's identifier, wherein the first and second authentication processes result in the first and second supplicant devices both being authorized at the same time to access their respec­tive first and second domain via the access port,
wherein the first and second authentication process are per­formed by:
receiving a first non-domain packet from each of the first and second supplicant device that does not specify a domain from the first or second supplicant device, wherein the first non-domain packet for each of the first and second supplicant devices includes the identifier associated with the first or second supplicant device;
sending a first authentication packet to each first and sec­ond supplicant device to thereby initiate the first and second authentication process, respectively;
determining that the first and second authentication pro­cess for each of the first and second supplicant, respec­tively, has been successful;
determining that the first supplicant device is a voice type device and that the first supplicant device or the first supplicant's user is authorized to access the first domain that is assigned for voice and determining that the sec­ond supplicant device or the second supplicant device's user is authorized to access the second domain that is assigned for data;
(i) forming a first binding between the identifier of the first supplicant device and the first domain that is assigned for voice, wherein the first binding specifies that the first supplicant device is allowed to access the first domain and the first binding is associated with the access port of the network device;
(ii) forming a second binding between the identifier of the first supplicant device and the second domain that is assigned for data, wherein the second binding specifies that the first supplicant device is allowed to access the second domain and the second binding is associated with the access port of the network device;
(iii) forming a third binding between the identifier of the second supplicant device and the second domain that is assigned for data, wherein the third binding specifies that the second supplicant device is allowed to access the second domain and the third binding is associated with the access port of the network device, wherein each of the first, second, and third bindings are formed without removing any of the other first, second, and third bind­ings; and
for the first supplicant device, receiving a first domain packet that specifies the first domain and removing the second binding for the first supplicant device without removing the first and third bindings.

12. An apparatus as recited in claim 11, wherein the first authentication process each uses an 802.1x protocol.

13. An apparatus as recited in claim 11, wherein it is deter­mined that the first supplicant device is a voice type device by collecting the identifier of the first supplicant device, sending the identifier of the first supplicant device to an authorization server, and receiving from the authorization server, in response to the identifier of the first supplicant device, an indication that the first supplicant device is a voice type device, and wherein the at least one of the processors and memory are further adapted for receiving from the authori­zation server an indication that the first supplicant device is authorized to access the first domain in response to sending the identifier of the first supplicant device to the authorization server.

14. An apparatus as recited in claim 11, wherein the at least one of the processors and memory are further adapted for:
if a second domain packet is received that is attempting to ingress into the first domain and the second domain packet matches the first binding if the first binding is present, allowing the second domain packet to access the first domain;
if a second domain packet is received that is attempting to ingress into the first domain and the second domain packet does not match the first binding or the first bind­ing is not present, blocking the second domain packet from accessing the first domain;
if a second domain packet is received that is attempting to ingress into the second domain and the second domain packet matches the second or third binding if the second or third binding is present, allowing the second domain packet to access the second domain; and
if a second domain packet is received that is attempting to ingress into the second domain and the second domain packet does not match the second or third binding or the second and third binding are not present, blocking the second domain packet from accessing the second domain.

15. An apparatus as recited in claim 11, wherein the opera­tions (i) through (iii) are performed substantially in parallel.

16. An apparatus as recited in claim 11, wherein the first domain is a first virtual local area network (VLAN) and the second domain is a second VLAN.

17. An apparatus as recited in claim 11, wherein the first supplicant device is coupled to the access port and the second supplicant device is coupled to the first supplicant device in a chained arrangement with the access port, and the second supplicant device communicates with the access port via the first supplicant device.

18. An apparatus as recited in claim 11, wherein the first supplicant device is authorized to access the first domain when an unauthorized user that is utilizing the first supplicant device is determined to be authorized to access the first domain.

19. An apparatus as recited in claim 11, wherein the at least one of the processors and memory are further adapted for blocking any devices from accessing any domains that are not specified by any binding that specifies access to a particular domain.

20. An apparatus in the form of a network device, comprising:
- means for performing a first authentication process to authorize a first supplicant device coupled with an access port of the network device to access a first domain of a network via the access port of the network device, wherein the first authentication process is based on an identifier of the first supplicant device; and
- means for performing a second authentication process to authorize a second supplicant device coupled with the access port to access a second domain of the network via the access port of the network device so that the access port is authorized to allow access to both the first domain by the first supplicant and the second domain by the second supplicant, wherein the first domain differs from the second domain, and wherein the second authentication process is based on an identifier of the second supplicant that differs from the first supplicant device's identifier, wherein the first and second authentication processes result in the first and second supplicant devices both being authorized at the same time to access their respective first and second domain via the access port;

wherein the first and second authentication process are performed by:
- receiving a first non-domain packet from each of the first and second supplicant device that does not specify a domain from the first or second supplicant device, wherein the first non-domain packet for each of the first and second supplicant devices includes the identifier associated with the first or second supplicant device;
- sending a first authentication packet to each first and second supplicant device to thereby initiate the first and second authentication process, respectively;
- determining that the first and second authentication process for each of the first and second supplicant, respectively, has been successful;
- determining that the first supplicant device is a voice type device and that the first supplicant device or the first supplicant's user is authorized to access the first domain that is assigned for voice and determining that the second supplicant device or the second supplicant device's user is authorized to access the second domain that is assigned for data;
- (i) forming a first binding between the identifier of the first supplicant device and the first domain that is assigned for voice, wherein the first binding specifies that the first supplicant device is allowed to access the first domain and the first binding is associated with the access port of the network device;
- (ii) forming a second binding between the identifier of the first supplicant device and the second domain that is assigned for data, wherein the second binding specifies that the first supplicant device is allowed to access the second domain and the second binding is associated with the access port of the network device;
- viii) forming a third binding between the identifier of the second supplicant device and the second domain that is assigned for data, wherein the third binding specifies that the second supplicant device is allowed to access the second domain and the third binding is associated with the access port of the network device, wherein each of the first, second, and third bindings are formed without removing any of the other first, second, and third bindings; and
- the first supplicant device, receiving a first domain packet that specifies the first domain and removing the second binding for the first supplicant device without removing the first and third bindings.

* * * * *